(12) United States Patent
Agarwal et al.

(10) Patent No.: US 11,405,776 B2
(45) Date of Patent: Aug. 2, 2022

(54) TROUBLESHOOTING AND RESOLVING ACCESS POINT FAILURES ON COMPUTER NETWORKS

(71) Applicant: HEWLETT PACKARD ENTERPRISE DEVELOPMENT LP, Houston, TX (US)

(72) Inventors: Gopal Agarwal, Karnataka (IN); Gopal Gupta, Karnataka (IN); Sumit Kumar, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 599 days.

(21) Appl. No.: 16/176,491

(22) Filed: Oct. 31, 2018

(65) Prior Publication Data
US 2020/0137561 A1    Apr. 30, 2020

(51) Int. Cl.
| | | |
|---|---|---|
| *H04W 8/30* | (2009.01) | |
| *H04W 76/18* | (2018.01) | |
| *H04W 48/08* | (2009.01) | |
| *H04W 76/12* | (2018.01) | |
| *H04W 88/16* | (2009.01) | |

(Continued)

(52) U.S. Cl.
CPC .............. *H04W 8/30* (2013.01); *H04W 4/80* (2018.02); *H04W 48/08* (2013.01); *H04W 76/12* (2018.02); *H04W 76/18* (2018.02); *H04W 88/16* (2013.01); *H04W 84/12* (2013.01)

(58) Field of Classification Search
CPC ....... H04W 8/30; H04W 76/12; H04W 76/18; H04W 4/80; H04W 48/08; H04W 88/16; H04W 84/12
See application file for complete search history.

(56) References Cited

U.S. PATENT DOCUMENTS

| | | | |
|---|---|---|---|
| 7,843,807 B2 | 11/2010 | Thomson | |
| 8,138,934 B2 * | 3/2012 | Veillette | .................... G06F 1/30 340/635 |

(Continued)

FOREIGN PATENT DOCUMENTS

CN    108235351    6/2018

OTHER PUBLICATIONS

Remote monitoring, (Web Page), Retrieved Aug. 14, 2018, 5 Pg.

*Primary Examiner* — Kibrom T Hailu
(74) *Attorney, Agent, or Firm* — Nolte Lackenbach Siegel (57) ABSTRACT

A method for troubleshooting and resolving access point device uplink failures. The method includes detecting an unresponsive access point on a wired computer network. In addition, the method includes retrieving a record of peer access points to determine the peer access points for the unresponsive access point. Further, the method proceeds to sending a first request to a peer access point of the unresponsive access point to query the unresponsive access point for a response over a wireless network. In response to the query, the network management system sends a notification that the unresponsive access point has a cable malfunction if the unresponsive access point responds to the query. Furthermore, the method includes, in response to the query, sending a notification to the network management system to inform that the unresponsive access point has a power malfunction if the unresponsive access point fails to respond to the query.

9 Claims, 5 Drawing Sheets

(51) Int. Cl.
*H04W 4/80* (2018.01)
*H04W 84/12* (2009.01)

(56) References Cited

U.S. PATENT DOCUMENTS

| | | | |
|---|---|---|---|
| 10,405,223 B1* | 9/2019 | Douberley | H04W 24/10 |
| 10,585,124 B1* | 3/2020 | Lee | H04L 41/065 |
| 2007/0281608 A1* | 12/2007 | Gould | H04W 88/04 |
| | | | 455/11.1 |
| 2008/0253314 A1 | 10/2008 | Stephenson et al. | |
| 2012/0002537 A1 | 1/2012 | Bao et al. | |
| 2012/0251034 A1* | 10/2012 | Chen | G02B 6/12004 |
| | | | 385/14 |
| 2012/0324087 A1* | 12/2012 | Cheifot | H04L 29/12009 |
| | | | 709/223 |
| 2016/0057688 A1* | 2/2016 | Koskinen | H04W 48/16 |
| | | | 370/332 |
| 2017/0013508 A1* | 1/2017 | Pallas | H04W 76/12 |
| 2017/0041899 A1* | 2/2017 | Venkatraman | G01S 5/0236 |
| 2017/0086082 A1* | 3/2017 | Narayanan | H04L 41/0645 |
| 2017/0156169 A1* | 6/2017 | Lakshmi Narayanan | |
| | | | H04L 41/0631 |
| 2019/0207649 A1* | 7/2019 | Mullin | H04B 3/54 |
| 2020/0136946 A1* | 4/2020 | Janarthanan | H04L 43/04 |

* cited by examiner

TROUBLESHOOTING AND RESOLVING ACCESS POINT FAILURES ON COMPUTER NETWORKS

BACKGROUND

Network devices on computer network systems occasionally experience failures. These failures may be caused by power malfunctions, physical breaches in cable uplinks, malfunctions in wireless network connections, etc. For example, a computer network system may host numerous access points, any of which may malfunction resulting in a crash. There are few mitigation procedures available to prevent these crashes or to deter the need for a system re-boot. In some scenarios, a system re-boot may not be necessary as there may be alternative measures to re-booting failed access points.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

DETAILED DESCRIPTION

The description of the different advantageous implementations has been presented for purposes of illustration and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated.

Before the present disclosure is described in detail, it is to be understood that, unless otherwise indicated, this disclosure is not limited to specific procedures or articles, whether described or not. It is further to be understood that the terminology used herein is for the purpose of describing particular implementations only and is not intended to limit the scope of the present disclosure.

It must be noted that as used herein, and in the claims, the singular forms "a," and "the" include plural referents unless the context clearly dictates otherwise.

An access point uplink can fail for several reasons. For example, an access point can fail due to a power failure, loose cable (e.g., uplink) connection or network cable malfunction, network topology issue, device malfunction, or software error. Many access points may also fail to function due to device overloads which may lead to lost keep-alive packets that are scheduled to be sent to a network management system on a periodic basis to report the device's health.

Instead of re-booting an access point in an attempt to resolve an issue, other measures may be taken to troubleshoot and resolve the access point malfunction. The present disclosure provides several procedures to remedy access point malfunctions with the least impact to the system as necessary to troubleshoot and resolve the problem.

In addition, the present disclosure provides methods for troubleshooting and resolving access point uplink failures. One method includes detecting an unresponsive access point on a wired computer network and retrieving a record of peer access points to determine the peer device assigned to the unresponsive access point. Further, the method includes sending a first access request to a peer access point of the unresponsive access point to query the unresponsive access point for a response over a wireless network. In response to the query, the network management system may send a notification that the unresponsive access point has a cable malfunction if the unresponsive access point responds to the query. Furthermore, in response to the query, a notification may be sent informing that the unresponsive access point has a power malfunction if the unresponsive access point fails to respond to the query. In addition, in response to the query, sending a notification that a gateway device has malfunctioned if the unresponsive access point is communicatively coupled to the network management system via the gateway device.

Figure 1:
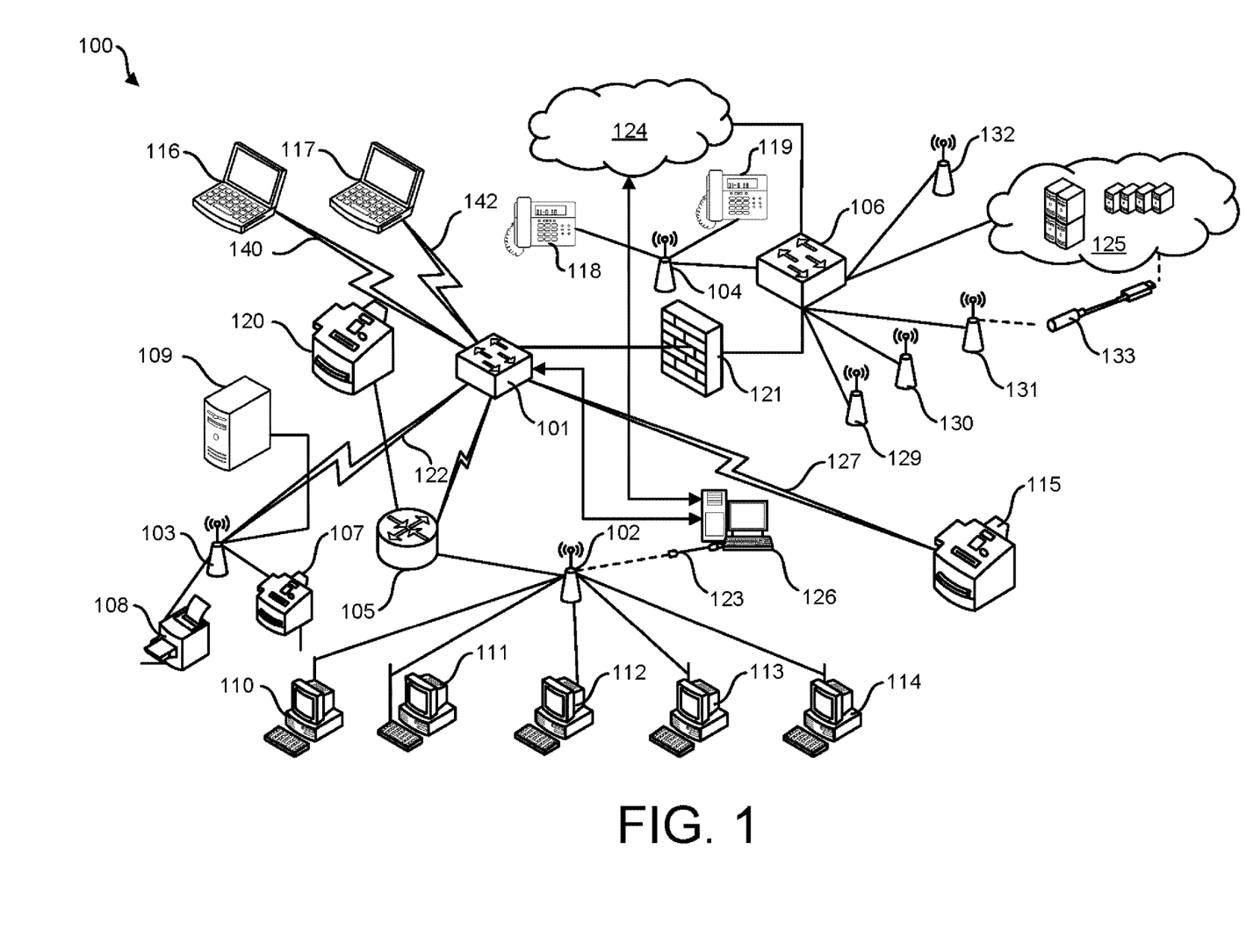
FIG. 1 is a topology of a computer network system which employs a method consistent with the present disclosure.

FIG. 1 is a topology of a computer network system 100 which employs a method consistent with the present disclosure. Computer network system 100 includes various network devices and network domains. It should be understood by those having ordinary skill in the art that the computer network system 100 shown in FIG. 1 is one example and that the techniques disclosed in the present disclosure may be implemented in other computer network systems 100.

Computer network system 100 has a gateway device (e.g., router) 101 which forwards data packets between network devices. For example, gateway device 101 can forward data packets to one or more client devices such as multi-function device 115 and laptops 116, 117. In the implementation shown, laptops 116, 117 are communicatively coupled to gateway device 101 over a wireless network 140, 142 and multi-function device 115 are coupled to gateway device 101 over wireless network 127. Gateway device 101 is also shown to be communicatively coupled to access points 103 over a wireless network 122.

Access point 103 is connected to a printer 108, a multi-functional device (e.g., all-in-one fax/copy/printer machine) 107, and a local server 109. Further, access point 103 may be connected to a switch device 128. Gateway device 101 may be communicatively coupled to an access point 104 which is communicatively coupled to networked telephones 118, 119, and may have access to the internet 124. In addition, a firewall 121 may be disposed between gateway device 101 and gateway device 106.

Gateway device 106 may have access to a network management system 125. Network management system 125 may include a network cloud system. Network management system 125 may communicate with the access points over a transmission control protocol (TCP/IP) interface in some implementations. In some implementations, network management system 125 may receive and store control information, statistics, logs, and functionality statuses for each network device on the computer network system 100. In some implementations, network management system 125 may also assign each network device a peer device (e.g., neighboring access point) to relay control information, statistics, and functionality status of a network device to a network management system 125 in the event of a failure. Network management system 125 may assign each access point on the computer network system 100 a peer device.

For example, network management system 125 may assign access point 103 to be a peer device for access point 102, and vice-versa. Therefore, in an event that there is a failure associated with access point 102, access point 103 can send control information, statistics, and functionality status to network management system 125 on behalf of peer access point 102.

It should be understood by one having ordinary skill in the art that the present disclosure is not limited to a single peer device for each access point on the computer network system 100. A network management system 125 may assign each access point with none, one, or more peer devices to send control information, statistics, and a functionality status of a failed access point. In addition, the peer device may service the failed access point's client devices.

In some implementations, the assigned peer device is in a different hierarchy than its supported access point. The present disclosure, however, is not limited to a reciprocal peer assignment. As such, a first access point may be assigned to be a peer device of a second access point. However, the second access point may not be assigned to be a peer access point to the first access point but to a third access point. In addition, the peer device assignments may be temporary and can be changed by the network management system 125 in response to changes on the computer network system 100. As such, the present disclosure may incorporate various peer assignment schemes so long as they do not depart from the spirit and scope of the present disclosure.

Gateway device 101 may be communicatively coupled to a switch 105 which in turn may be communicatively coupled to access point 102 and service multi-function device 120. Access point 102 may service workstations 110-114 or other devices. In addition, access point 102 may be equipped with an uplink cable 123 which in turn is connected to a computer system 126. The computer system 126 may have a wired connection 123 to the internet 124.

Figure 2:
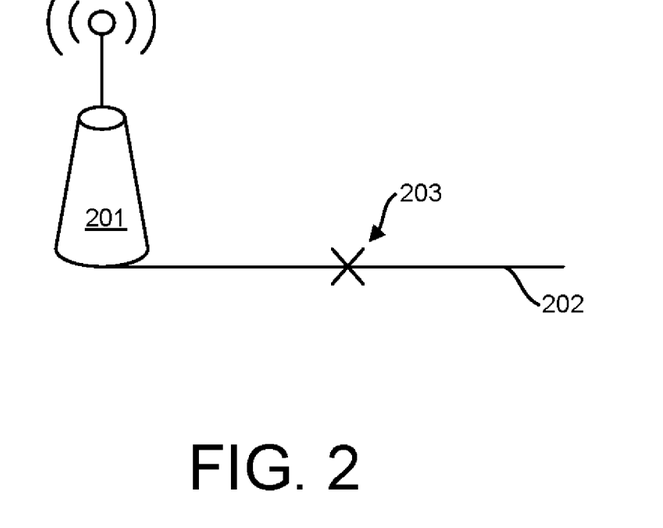
FIG. 2 is an illustration of an access point with a breach present in an uplink cable.

FIG. 2 is an illustration of an access point 201 with a breach 203 present in an uplink cable 202. Techniques described within the present disclosure may be used to troubleshoot and resolve the breach 203 without causing a system re-boot of the access point 201. Herein, a breach 203 may include a physical or functional defect in the uplink cable 202. An uplink cable 202 may be damaged or have frayed wires which both may constitute a breach 203.

Now referring back to FIG. 1, if there is a breach in the connection of uplink cable 123 to computer system 126 such that the network management system 125 is unable to communicate with access point 102, the network management system 125 can send a request to peer access point 103 to "ping" or query access point 102. In some implementations, the network management system 125 may determine that a problem entails with the communication between the network management system 125 and an access point due to a loss of keep-alive packets that are scheduled to be sent the network management system 125 on a periodic basis. In some implementations, a ping may constitute a basis service set identifier scan (BSSID scan).

In some implementations, peer access point 103 sends a query to access point 102 over a wireless network (e.g., 802.11 network or Bluetooth) upon a request by network management system 125. As such, the querying peer access point 103 functions as a WLAN (e.g., 802.11) client of the queried access point 102, for example by sending a query in the form of a probing packet that was usually transmitted by a WLAN client device to access point 102. If a response is sent back to the peer access point 103 in response to the query, a notification may be sent from a network management system 125 to an administrator informing that the uplink cable 123 connected to access point 102 is breached (e.g., has a defect or needs to be re-connected). In other examples, the query may be sent from access point 103 to access point 102 via a wireless connection on an alternative network (e.g., a network in compliance with alternative wireless protocols such as, but not limited to, Bluetooth, BLE, ZigBee, mesh, etc.).

The system determines whether the root cause of an uplink failure can be resolved without rebooting. For example, the system may send an alert to an administrator or to instruct an alternative device in the network that contributed to the uplink failure to reboot. Accordingly, an administrator can determine the root cause of an uplink cable without causing a system re-boot of access point 103 as a system re-boot may fail to solve the malfunction in many instances.

Figure 3:
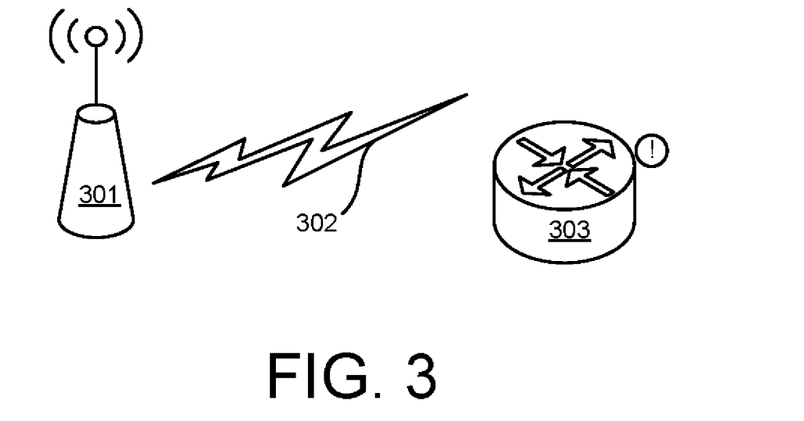
FIG. 3 is an illustration of an access point communicatively coupled to a defective switch device.

FIG. 3 is an illustration of an access point 301 communicatively coupled to a defective switch device 303 over a wireless network 302. Techniques described within the present disclosure may be used to troubleshoot and resolve the breach without causing a system re-boot of the access point 301.

Now referring back to FIG. 1, if switch device 105 has a malfunction such that access point 102 has a problem connecting to network management system 125, network management system 125 can send a request to an assigned peer access device of an access point 104 to determine the functionality status of the unresponsive device.

For example, access point 103 may be assigned as the peer access point device to access point 102 and therefore access point 102 may communicate with access point 102 over a wireless network (e.g., 802.11 or Bluetooth network).

In some implementations, network management system 125 may request that access point 103 take over the network service requirements of the client devices (i.e., computer workstations 110-114) under the domain of access point 102 until the switch device 105 is repaired or replaced. In some implementations, network management system 125 assigns both access point 103 and access point 104 as the peer access points of access point 102 such that the load of AP 102 can be balanced across a plurality of peer APs. As such, access point 103 may take over the network service requirements of computer workstations 110, 111 and access point 104 may take over the network service requirements of computer workstations 112-114 until switch device 105 is repaired or replaced in an attempt to divide up the network load to mitigate network degradation caused by the additional loads.

Accordingly, the client devices under the domain of a failed access point device may be reassigned to other functional access points by the network management device 125. However, network management system 125 may decide to leave some of the client devices under the domain of the failed access point underserved. As such, network management system 125 may implement a priority scheme to the client devices or any other network device on the computer network system 100 in the event of a device or network failure.

Figure 4:
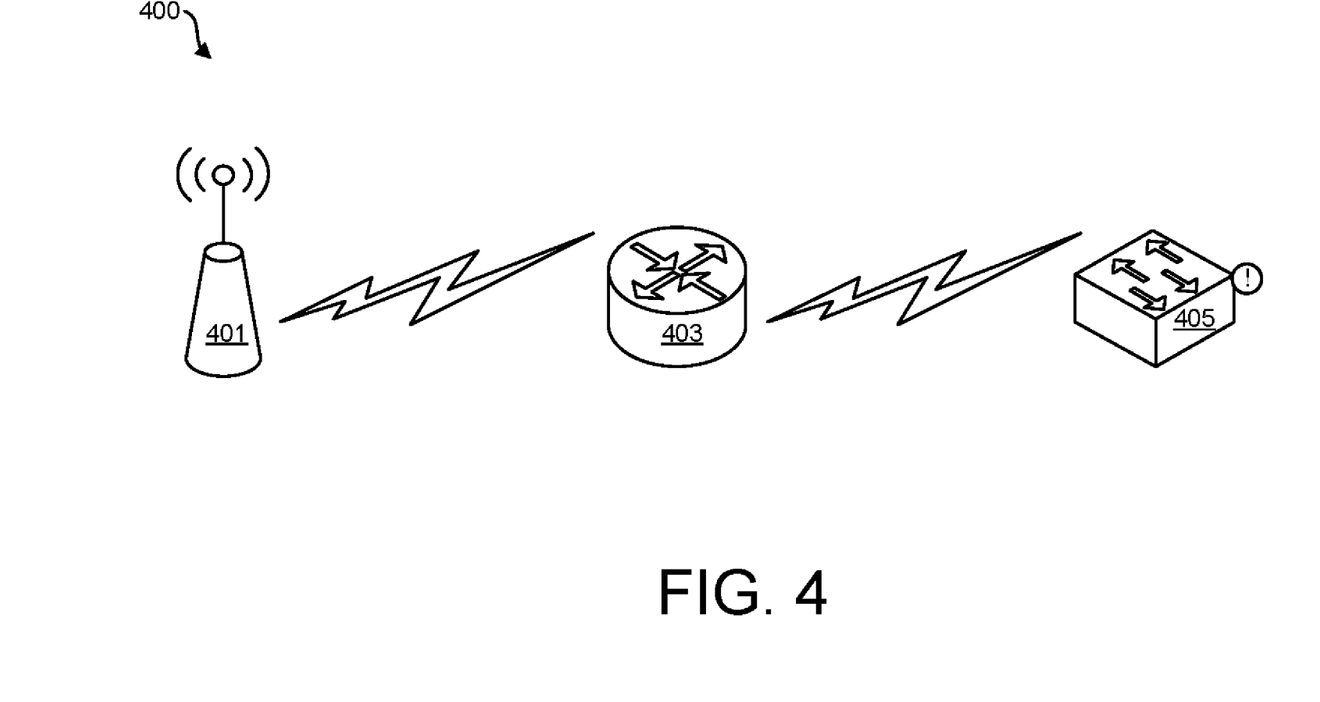
FIG. 4 is an illustration of a network hierarchy comprising an access point, switch device, and defective gateway device.

FIG. 4 is an illustration of a network hierarchy 400 comprising an access point device 401, switch device 403, and defective gateway device 405 on a wireless network. Techniques described within the present disclosure may be used to troubleshoot and resolve scenarios which involve defective gateway devices.

Now referring back to FIG. 1, if gateway device 101 has a malfunction, access point 102 may be unable to contact network management system 125 or service the client devices under its domain (e.g., computer workstations 110-114). Accordingly, network management system 125 may attempt to communicate with access point 102 unsuccessfully.

If access point 103 is assigned by the network management system 125 to be the peer device of access point 102, the network management system 125 may require that access point 102 query access point 103 to determine its functionality status. If the access point 102 responds to the request, the network management system 125 may determine that the access point 102 is functional and that a problem exists elsewhere on the computer network system 100. Likewise, network management system 125 may request that the assigned peer device (e.g., access point 103) take over the network service requirements of the client devices (e.g., computer workstations 110-114) of access point 102. In some implementations, access point 102 may tunnel all of its wireless client device data to peer access point 103 such that the network service requests by the client devices 110-114 are effectively steered to the peer device (e.g., access point 103).

In some implementations, to steer some of the clients to neighboring APs (e.g., for clients which are located within the radio frequency coverage area of the neighboring APs), the remaining client data are tunneled from the failed AP to a neighboring AP (these remaining clients that do not have direct access to the neighboring AP will connect to the neighboring AP via another AP in the wireless network by a secured tunnel). The AP with the uplink failure may also function as a WLAN client and tunnel received traffic via a neighboring AP to the neighboring AP, then a subset of users/clients corresponding to a premium status/role or a subset of traffic corresponding to high priority traffic may be selected. If there are too many clients to be tunneled to another AP, then premium users/clients or high priority traffic may be selected.

In another example, a plurality of access points 104, 129-132 may be connected to a defective gateway device 106. If one of the access points 131 is also connected to network management system 125 via a dongle 133 as a fall back facility to access network management system 125, access point 131 can be directed to forward control messages, statistics, and functionality statuses of the other access points 104, 129, 130, 132 hosted by the failed gateway device 106 to network management system 125. For example, access point 131 may be directed to ping the other access points 104, 129, 130, 132 over a wireless network in response to a request from the network management system 125. Access point 131 may also be tasked to service the client devices serviced by access points 104, 129, 130, 132 (e.g., telephones 118, 119).

Figure 5:
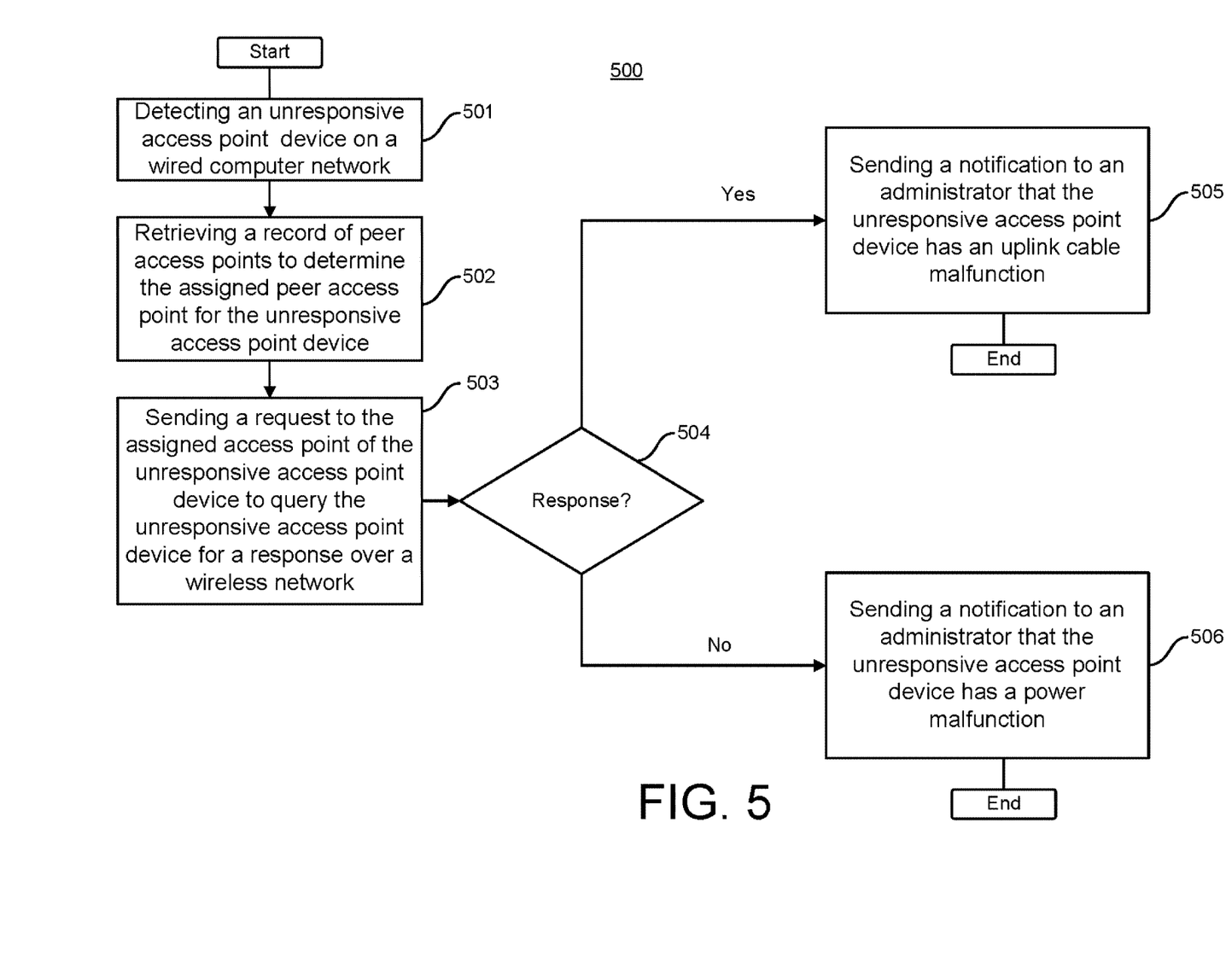
FIG. 5 is a method for troubleshooting and resolving access point uplink failures according to one implementation of the present disclosure.

FIG. 5 is a method 500 for troubleshooting and resolving access point uplink failures according to one implementation of the present disclosure. As shown, method 500 begins with detecting an unresponsive access point on a wired computer network (block 501).

Next, method 500 proceeds to retrieving a record of peer access points to determine the peer access points assigned to the unresponsive access point (block 502). Next, sending a request to a peer device assigned to the unresponsive access point to query (e.g., ping) the unresponsive access point to seek a response over a wireless network (block 503) and then wait in return for a response (block 504).

Further, according to block 505, if the peer device receives a response, sending a notification to an administrator that the unresponsive access point has an uplink cable malfunction.

Alternatively, if a response is not received, sending a notification (e.g., to an administrator) to inform that the unresponsive access point has a power malfunction (e.g., power malfunction, loose power cord, etc.) to a network management system (block 506) which informs an administrator in some implementations.

In some implementations, the present disclosure may be used to determine whether an access device has a software error rather than an uplink malfunction. For example, if an access point has a functional uplink and is sufficiently powered, the access point may be able to communicate with a peer device but not with a network management system due to a software error. As such, when the peer access point pings the failed access point, the failed access point may communicate to the peer device over a wireless network that its uplink is functional. This response may be indicative that there is no apparent issue with power. Accordingly, the network management system may request that the unresponsive access point perform a system re-boot.

Figure 6:
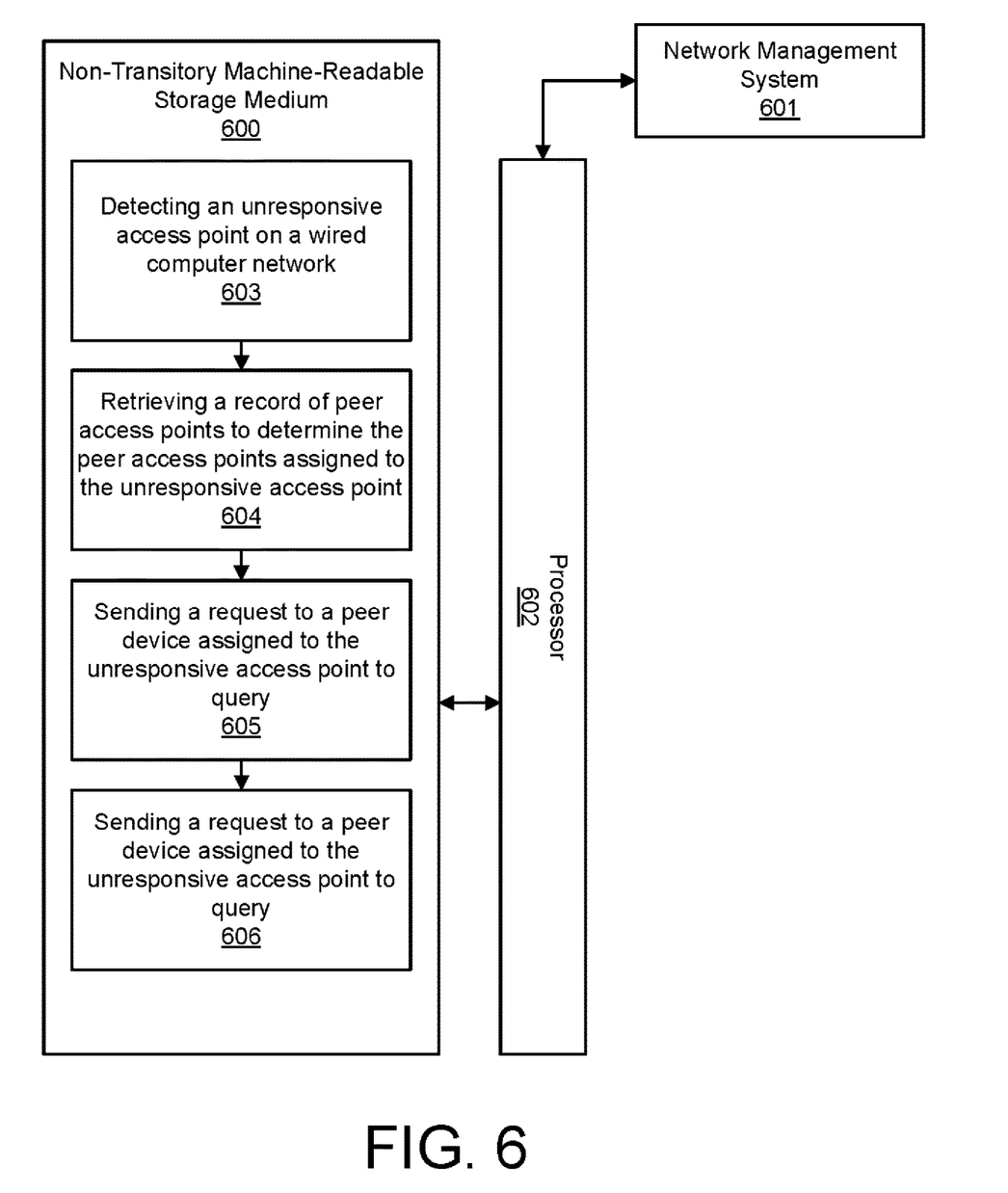
FIG. 6 illustrates instructions and data for troubleshooting and resolving access point uplink failures according to one implementation of the present disclosure.

FIG. 6 illustrates instructions and data for troubleshooting and resolving access point uplink failures according to one implementation of the present disclosure. The troubleshooting may be accomplished by a network management system 601 that retrieves instructions stored on a non-transitory machine-readable storage medium 600 via a processor 602.

For example, the instructions may include detecting an unresponsive access point on a wired computer network (603), retrieving a record of peer access points to determine the peer access points assigned to the unresponsive access point (604), sending a request to a peer device assigned to the unresponsive access point to query (605), and if the peer device receives a response, sending a notification to an administrator that the unresponsive access point has an uplink cable malfunction or if a response is not received, sending a notification to inform that the unresponsive access point has a power malfunction to a network management system (606).

Although the present disclosure has been described in detail, it should be understood that various changes, substitutions and alterations can be made without departing from the spirit and scope of the disclosure. Any use of the words "or" and "and" in respect to features of the disclosure indicates that examples can contain any combination of the listed features, as is appropriate given the context.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present disclosure. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method for troubleshooting uplink failures, comprising:
   detecting an unresponsive access point to a network management system on a wired computer network;
   sending a first request to a peer access point of the unresponsive access point to query the unresponsive access point for a response over a wireless network, in response to the query:
   sending a first notification that the unresponsive access point has a cable malfunction if the unresponsive access point responds to the query, and
   sending a second notification that the unresponsive access point has a power malfunction if the unresponsive access point fails to respond to the query;
   sending a second request to the peer access point to service a request from at least one of a plurality of client devices of the unresponsive access point.

2. The method of claim 1, wherein the power malfunction comprises a power failure.

3. The method of claim 1, wherein the cable malfunction comprises a loose uplink cable.

4. The method of claim 1, wherein the query comprises a ping.

5. The method of claim 1, further comprising retrieving a record of peer access points to identify the peer devices assigned to the unresponsive access point.

6. The method of claim 1, further comprising assigning priorities to each of the plurality of client devices of the unresponsive access point.

7. The method of claim 6, wherein in response to the query, sending a third notification that a gateway device which connects the unresponsive access point to the network management system has malfunctioned.

8. The method of claim 1, wherein the wireless network comprises at least one of a 802.11 protocol and a Bluetooth network protocol.

9. The method of claim 1, wherein the unresponsive access point is detected by the network management system hosted in a network cloud.

* * * * *